(12) United States Patent
Sixt et al.

(10) Patent No.: US 8,304,505 B2
(45) Date of Patent: Nov. 6, 2012

(54) CONDENSATION-CROSSLINKING SILICONE MATERIALS

(75) Inventors: Torsten Sixt, Mehring (DE); Franz Neuhauser, Geretsberg (AT)

(73) Assignee: Wacker Chemie AG, Munich (DE)

( * ) Notice: Subject to any disclaimer, the term of this patent is extended or adjusted under 35 U.S.C. 154(b) by 6 days.

(21) Appl. No.: 12/831,428

(22) Filed: Jul. 7, 2010

(65) Prior Publication Data

US 2011/0028646 A1    Feb. 3, 2011

(30) Foreign Application Priority Data

Jul. 31, 2009  (DE) .................. 10 2009 028 140

(51) Int. Cl.
  *C08G 77/04*  (2006.01)
  *C08G 77/08*  (2006.01)
  *C08L 83/04*  (2006.01)

(52) U.S. Cl. ............................ 528/14; 524/588; 524/858
(58) Field of Classification Search .......................... None
  See application file for complete search history.

(56) References Cited

U.S. PATENT DOCUMENTS

| | | | | |
|---|---|---|---|---|
| 3,033,807 A * | 5/1962 | Krueckel | ....................... | 524/394 |
| 4,585,822 A * | 4/1986 | Streusand | ....................... | 524/443 |
| 4,618,646 A * | 10/1986 | Takago et al. | ................... | 524/783 |
| 4,906,719 A | 3/1990 | Chu | | |
| 5,068,277 A * | 11/1991 | Vukov et al. | ................... | 524/441 |
| 5,079,324 A * | 1/1992 | Cocco et al. | ....................... | 528/14 |
| 5,288,795 A * | 2/1994 | Fujiki et al. | ..................... | 524/731 |
| 5,663,269 A | 9/1997 | Chu | | |
| 5,985,991 A * | 11/1999 | Beljanski et al. | ............... | 524/779 |
| 8,030,371 B2 | 10/2011 | Chaussade | | |
| 2004/0220331 A1 | 11/2004 | Sixt | | |
| 2006/0258817 A1* | 11/2006 | Kimura | ........................ | 525/477 |
| 2007/0088123 A1* | 4/2007 | Futatsumori et al. | .......... | 524/863 |
| 2007/0173624 A1* | 7/2007 | Chaussade et al. | .............. | 528/14 |
| 2007/0191541 A1 | 8/2007 | Guennouni | | |
| 2007/0249782 A1* | 10/2007 | Scheim et al. | ................. | 524/588 |
| 2008/0293865 A1* | 11/2008 | Kameda et al. | ................ | 524/425 |
| 2009/0131553 A1 | 5/2009 | Chaussade | | |
| 2009/0234052 A1* | 9/2009 | Maton et al. | ................... | 524/147 |

FOREIGN PATENT DOCUMENTS

| | | |
|---|---|---|
| DE | 2228645 A | 12/1972 |
| DE | 4213873 A1 | 11/1993 |
| DE | 4427528 A1 | 2/1996 |
| DE | 10319303 A1 | 12/2004 |
| DE | 102006060357 A1 | 7/2007 |
| EP | 0747443 A2 | 12/1996 |
| EP | 0853101 A1 | 7/1998 |
| EP | 1209201 A1 | 5/2002 |
| EP | 1254192 B1 | 8/2004 |
| EP | 1230298 B1 | 7/2009 |
| GB | 1374834 A | 11/1974 |
| WO | 0129127 A1 | 4/2001 |
| WO | 0149774 A2 | 7/2001 |
| WO | 2008142998 A1 | 11/2008 |

\* cited by examiner

*Primary Examiner* — Robert S Loewe
(74) *Attorney, Agent, or Firm* — Brooks Kushman P.C.

(57) ABSTRACT

Materials crosslinkable at room temperature by condensation are based on organosilicon compounds which cure to give permanently resilient materials, and which employ one or more compounds of the metals Li, Na, K, Mg, Ca, or Sr as catalyst.

8 Claims, No Drawings

CONDENSATION-CROSSLINKING SILICONE MATERIALS

CROSS-REFERENCE TO RELATED APPLICATIONS

This application claims priority to German Patent Application No. DE 10 2009 028 140.1 filed Jul. 31, 2009 which is herein incorporated by reference.

BACKGROUND OF THE INVENTION

1. Field of the Invention

The invention relates to materials which are crosslinkable at room temperature by condensation and are based on organosilicon compounds which cure to give permanently resilient materials.

2. Background Art

One-component sealing compounds which are storable in the absence of water and crosslink on admission of water with elimination of, for example, alcohols at room temperature to give elastomers, also referred to as RTV-1 sealing compounds, are known. These products are used, for example, in large amounts in the construction industry.

The basis of these RTV-1 sealing compounds are polymers with silyl groups which have reactive substituents such as OH groups or hydrolyzable alkoxy groups. Furthermore, these sealing compounds may have various fillers, plasticizers, adhesion promoters, catalysts and so-called crosslinking agents or further additives, such as, for example, colored pigments, rheology additives or fungicides.

The prior art has already disclosed various RTV-1 compounds. WO 01/49774 A2 and EP 1 254 192 B1 describe, for example, materials containing various titanium esters, mixed esters and titanium chelates. However, these have the known disadvantages of Ti, such as, for example, yellowing, surface tack, slow vulcanization rate and stability problems during storage. A further disadvantage is the incompatibility of many titanium compounds with customary aminosilane-based adhesion promoters.

There are various approaches for solving these problems. Regarding the yellowing problem, U.S. Pat. No. 4,906,719 discloses, for example, the addition of organomercaptans as additives. EP 0 747 443 A2 and DE 42 13 873 A1 describe titanium complexes with oxygen donors which show reduced yellowing.

In order to solve the problem of surface tack or slow vulcanization, EP 0 853 101 A1 describes a mixture which contains alkoxysilanes and which must comply with a certain molar ratio between the individual starting materials.

In order to solve the problem of low storage stability, DE 44 27 528 A1 describes the use of cyclically substituted complexes based on diolates of the metals of the $4^{th}$ subgroup in silicone compositions.

In order to avoid the incompatibility of many titanium compounds with customary aminosilane-based adhesion promoters, methods were developed, as described in DE 22 28 645 A1 and EP 1 209 201 A1, which also avoid crepe hardening on compounding. However, this has the disadvantage that a more complicated two-stage compounding sequence is necessary.

The prior art, for example, DE 103 19 303 A1 and DE 10 2006 060 357 A1, discloses RTV-1 materials which furthermore contain dibutyl- or dioctyltin compounds as catalysts since these do not have disadvantages such as yellowing, low storage stability and in particular aminosilane incompatibility. The use of organotin compounds is, however, now controversial since limitations were imposed on the use of dibutyl- and dioctyltin compounds by amendment of EU Directive 76/769/EEC of May 28, 2009.

EP 1 230 298 A1 describes the use of salts of tin, zinc, iron, barium, zirconium and lead, preferably as metal salt carboxylates, and metal octanoates of iron and lead as a tin-free system. However, the disadvantage that these compounds are slow catalysts is common to all of them. Moreover, some of the compounds described there are unsafe for health reasons. In addition to the previous statements regarding tin compounds, for example, Ba carboxylates, as hazardous substances of class R20/22 according to the German regulation on hazardous material, are subject to mandatory labeling.

SUMMARY OF THE INVENTION

It was therefore an object of the present invention to provide condensation-crosslinking silicone compositions which permit rapid crosslinking and at the same time do not have the disadvantages of yellowing, surface tack, slow vulcanization rate, stability problems during storage and incompatibility with customary aminosilane-based adhesion promoters, and moreover the use of which is not harmful to health.

DETAILED DESCRIPTION OF THE PREFERRED EMBODIMENT(S)

For the purposes of the present invention, the designation "condensation reaction" is also intended to include an optionally preceding hydrolysis step. For the purposes of the present invention, the designation "condensable radicals" is also to be understood as meaning those radicals from which condensable groups are produced in an optionally preceding hydrolysis step.

The present invention therefore relates to condensation-crosslinking silicone compositions containing (A) at least one organosilicon compound having at least 2 condensable groups,
(B) at least one crosslinking agent,
(C) at least one filler,
(E) at least one catalyst in catalytic amounts,
wherein the catalyst comprises at least one catalyst selected from the group consisting of compounds of the metals Li, Na, K, Mg, Ca or Sr.

In a further embodiment, the condensation-crosslinking silicone compositions according to the invention contain at least one adhesion promoter (D) as a further constituent.

The condensable groups possessed by the organosilicon compounds (A) and which participate in the crosslinking reaction may be any desired groups, for example, hydroxyl, oximato, amino, acyloxy and organyloxy groups.

The organosilicon compounds (A) may be all organosilicon compounds having at least two condensable groups which are useful in materials crosslinkable by condensation reaction. They may be either pure siloxanes, i.e. ≡Si—O—Si≡ structures, or silcarbanes, i.e. ≡Si—R"—Si≡ structures where R" is a hydrocarbon radical which is divalent, optionally substituted, or interrupted by heteroatoms or any desired polymers and copolymers having organosilicon groups.

Organosilicon compounds (A) are preferably those of the formula (II)

$$Y_{3-f}R_f Si\text{—}(SiR_2\text{—}O)_e\text{—}SiR_f Y_{3-f} \qquad (II),$$

in which

R, independently of one another, are identical or different, substituted or unsubstituted hydrocarbon radicals which are optionally interrupted by oxygen atoms, Y, independently of one another, are identical or different hydroxyl radicals or hydrolyzable radicals, e is 30 to 3000 and f is 0, 1 or 2.

Preferably, f is 2 if Y is —OH, and f is 1 or 0 if Y differs from —OH.

Preferably, radicals R are monovalent hydrocarbon radicals having 1 to 18 carbon atoms which are optionally substituted by halogen atoms, amino groups, ether groups, ester groups, epoxy groups, mercapto groups, cyano groups or (poly)glycol radicals, the latter being composed of oxyethylene and/or oxypropylene units, more preferably alkyl radicals having 1 to 12 carbon atoms, and in particular the methyl radical. Radicals R can, however, also be divalent radicals which, for example, link two silyl groups to one another.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl or tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical and the α- and the β-phenylethyl radicals.

Examples of substituted radicals R are the methoxyethyl, ethoxyethyl and ethoxyethoxyethyl radicals.

Examples of divalent radicals R are polyisobutylenediyl radicals and propanediyl-terminated polypropylene glycol radicals.

Examples of radicals Y are the hydroxyl radical and all useful hydrolyzable radicals, for example, optionally substituted hydrocarbon radicals bonded to a silicon atom via an oxygen atom or a nitrogen atom.

Preferably, radical Y is a hydroxyl radical or radical —OR$^1$, in which R$^1$ denotes substituted or unsubstituted hydrocarbon radicals which may be interrupted by oxygen atoms. Examples of Y are methoxy, ethoxy, n-propoxy, isopropoxy, n-butoxy, isobutoxy, s-butoxy, tert-butoxy and 2-methoxyethoxy radicals; amino radicals such as methylamino, dimethylamino, ethylamino, diethylamino and cyclohexylamino radicals; amido radicals such as N-methylacetamido and benzamido radicals; aminoxy radicals such as the diethylaminoxy radical; oximo radicals such as dimethylketoximo, methylethylketoximo and methylisobutylketoximo radicals; enoxy radicals such as the 2-propenoxy radical; and acyloxy radicals such as acetyl groups.

Examples of radicals R$^1$ are the monovalent, optionally substituted hydrocarbon radicals mentioned for R. Preferably, radicals R$^1$ are alkyl or acyl radicals having 1 to 12 carbon atoms, more preferably radicals having 1 to 3 carbon atoms.

Most preferably, radical Y is a hydroxyl radical or radical —OR$^1$ where R$^1$ has the abovementioned meaning, in particular R$^1$ is preferably a methyl or ethyl radical, or the acetyl radical.

Examples of organosilicon compounds (A) are
(MeO)$_2$MeSiO[SiMe$_2$O]$_{200-2000}$SiMe(OMe)$_2$,
(MeO)(EtO)MeSiO[SiMe$_2$O]$_{200-2000}$SiMe(OMe)(OEt),
(MeO)$_2$MeSiO[SiMe$_2$O]$_{200-2000}$SiMe$_2$(OH),
(HO)Me$_2$SiO[SiMe$_2$O]$_{200-2000}$SiMe$_2$(OH),
(EtO)$_2$MeSiO[SiMe$_2$O]$_{200-2000}$SiMe(OEt)$_2$,
(MeO)$_2$ViSiO[SiMe$_2$O]$_{200-2000}$SiVi(OMe)$_2$,
(MeO)$_2$MeSiO[SiMe$_2$O]$_{200-2000}$SiVi(OMe)$_2$ and
(EtO)$_2$ViSiO[SiMe$_2$O]$_{200-2000}$SiVi(OEt)$_2$,
(AcO)$_2$ViSiO[SiMe$_2$O]$_{200-2000}$SiVi(OAC)$_2$,
(AcO)$_2$MeSiO[SiMe$_2$O]$_{200-2000}$SiVi(OAc)$_2$ and
(AcO)$_2$EtSiO[SiMe$_2$O]$_{200-2000}$SiEt(OAc)$_2$, in which Me denotes a methyl radical, Et an ethyl radical, Vi a vinyl radical and Ac an acetyl radical.

The organosilicon compounds (A) preferably have a viscosity of 100 to 10$^6$ mPa·s, more preferably of 10$^3$ to 350,000 mPa·s, in each case at 25° C., and are commercially available products or can be prepared by methods customary in silicon chemistry.

The crosslinking agents (B) used in the silicone compositions may be any desired crosslinking agents having at least three condensable radicals, such as, for example, silanes or siloxanes having at least three organyloxy groups.

The crosslinking agents (B) used in the silicone compositions are preferably organosilicon compounds of the general formula (III)

$$Z_c SiR^2_{(4-c)} \qquad (III),$$

in which

R$^2$ may be identical or different and denotes monovalent, optionally substituted hydrocarbon radicals which may be interrupted by oxygen atoms, Z may be identical or different and has a meaning mentioned above for Y, except for a hydroxyl group, and c is 3 or 4, and the partial hydrolyzates thereof.

The partial hydrolyzates may be partial homohydrolyzates, i.e. partial hydrolyzates of one type of organosilicon compound of the general formula (III), as well as partial cohydrolyzates, i.e. partial hydrolyzates of at least two different types of organosilicon compounds of the general formula (III).

Although not indicated in formula (III), the organosilicon compounds used according to the invention may have a small proportion of hydroxyl groups, preferably up to not more than 5% of all Si-bonded radicals, as a result of the method of preparation.

If the crosslinking agents (B) used in the materials according to the invention are partial hydrolyzates of organosilicon compounds of the formula (III), those having up to 10 silicon atoms are preferred.

Examples of radical R$^2$ are the monovalent examples mentioned for radical R, hydrocarbon radicals having 1 to 12 carbon atoms being preferred and the methyl and the vinyl radical being particularly preferred.

Examples of Z are the examples mentioned for Y, except for the hydroxyl group.

The crosslinking agents (B) are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyl-triethoxysilane, 3-(glycidyloxy)propyltriethoxysilane, 1,2-bis(tri-methoxysilyl)ethane, 1,2-bis(triethoxysilyl)ethane, methyltris(methylethyl-ketoximo)silane, vinyltris(methylethylketoximo)silane and tetra-kis(methylethylketoximo)silane and partial hydrolyzates of the above-mentioned organosilicon compounds, for example, hexaethoxydisiloxane, and acyloxysilanes, such as vinyltriacetoxysilane, methyltriacetoxysilane or ethyltriacetoxysilane and the partial and mixed hydrolyzates thereof.

Most preferably, the crosslinking agents (B) are tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyl)ethane, methyltris(methylethyl-ketoximo)silane, vinyltris(methylethylketoximo)silane and the partial hydrolyzates thereof, in particular methyltrimethoxysilane, vinyltriethoxysilane, methyltris(methylethylketoximo)silane and vinyltris(methylethylketoximo)silane, and the partial hydrolyzates thereof and vinyltriacetoxysilane, methyltriacetoxysilane or ethyltriacetoxysilane and the partial and mixed hydrolyzates thereof.

The crosslinking agents (B) used in the materials according to the invention are commercially available products or can be prepared by processes known in silicon chemistry.

The crosslinking agents (B) according to the invention are preferably used in amounts of 1 to 10 parts by weight, more preferably 2 to 8 parts by weight, and in particular 3 to 5 parts by weight, based in each case on 100 parts by weight of crosslinkable material.

All fillers which are useful for preparing RTV-1 materials can be used as fillers (C). Examples of fillers (C) are non-reinforcing fillers, i.e. fillers having a BET surface area of up to 50 m$^2$/g, such as quartz, diatomaceous earth, calcium silicate, zirconium silicate, zeolites, metal oxide powders such as aluminum, titanium, iron or zinc oxides or the mixed oxides thereof, barium sulfate, calcium carbonate, gypsum, silicon nitride, silicon carbide, boron nitride, glass and plastic powders such as polyacrylonitrile powders, and reinforcing fillers, i.e. fillers having a BET surface area of more than 50 m$^2$/g, such as pyrogenically prepared silica, precipitated silica, precipitated chalk, carbon black such as furnace and acetylene black, and mixed silicon aluminum oxides having a high BET surface area, and fibrous fillers such as asbestos and plastic fibers. The fillers previously mentioned may have been hydrophobized, for example by treatment with organosilanes or organosiloxanes or with stearic acid or by etherification of hydroxyl groups to give alkoxy groups.

The fillers (C) are preferably pyrogenic silica, coated or uncoated calcium carbonates, metal silicates, quartz or carbon blacks.

Fillers (C) are preferably used in amounts of 5 to 50 parts by weight, more preferably 7 to 35 parts by weight, based in each case on 100 parts by weight of crosslinkable material.

Examples of the adhesion promoters (D) are silanes and organopolysiloxanes having functional groups, for example, those having glycidyloxy, amino or methacryloyloxy radicals. Furthermore, silanes having hydrolyzable groups and SiC-bonded vinyl, acryloyloxy, methacryloyloxy, epoxy, acid anhydride, acid, ester or ether groups and the partial and mixed hydrolyzates thereof can also be used as adhesion promoter(s) (D). Preferred adhesion promoters are amino-, acryloyl- and epoxy-functional silanes having hydrolyzable groups and the partial hydrolyzates thereof.

The silicone compositions preferably contain adhesion promoter(s) (D) in amounts of 0 to 50 parts by weight, more preferably 0.1 to 20 parts by weight, and in particular 0.5 to 10 parts by weight, based in each case on 100 parts by weight of organosilicon compound (A).

In principle, metal compounds of main groups I and II are suitable as catalysts (E) according to the invention. However, Li-, Na-, K-, Mg-, Ca-, and Sr-compounds are preferably used since they permit rapid crosslinking and moreover, for example, their use does not lead to health hazards. Li and Sr compounds are particularly preferred.

The metal salts of the abovementioned six metals are preferred as catalysts (E), and metal carboxylates are particularly preferred. Li and Sr carboxylates are particularly preferred.

The silicone compositions according to the invention preferably contain catalysts (E) in amounts of, 0.1 to 1.0 part by weight, based on 100 parts by weight of crosslinkable material.

In addition to the components (A) to (E) described above, the silicone compositions may also contain all further constituents which are useful in materials crosslinkable by condensation reaction. Examples of further constituents which can be used in the compositions are plasticizers, curing accelerators (which differ from the abovementioned components), soluble dyes, inorganic and organic pigments, solvents, fungicides, fragrances, dispersants, rheological additives, corrosion inhibitors, antioxidants, light stabilizers, heat stabilizers, flame-retardant agents and agents for influencing the electrical properties.

The silicone compositions according to the invention may contain such further constituents in amounts of up to 60 parts by weight, based on 100 parts of crosslinkable material.

In a process for the preparation of the compositions according to the invention, all constituents can be mixed with one another in the sequence which is usual and therefore corresponds to the prior art. This mixing can be effected at room temperature and ambient pressure, i.e. about 900 to 1100 hPa. If desired, however, this mixing can also be effected at higher temperatures, for example at temperatures in the range from 35° C. to 135° C. Furthermore, it is possible to effect mixing from time to time or continuously under reduced pressure, such as, for example, at 30 to 500 hPa absolute pressure, in order to remove volatile compounds or air.

The individual constituents of the compositions according to the invention may be in each case one type of such a constituent as well as a mixture of at least two different types of such constituents.

The usual water content of the air is sufficient for crosslinking the materials according to the invention. The crosslinking of the materials is preferably effected at room temperature. It can, if desired, also be carried out at higher or lower temperatures than room temperature, for example at −5° C. to 15° C. or at 30° C. to 50° C. and/or by means of concentrations of water which exceed the normal water content of the air. Preferably, the crosslinking is effected at a pressure of 100 to 1100 hPa, in particular at ambient pressure, i.e. about 900 to 1100 hPa.

The silicone compositions according to the invention are suitable as adhesives, sealing compounds and coatings and for the potting of components.

The advantage of the silicone compositions which contain catalysts (E) is a more rapid course of vulcanization (shorter skin formation times and better deep vulcanization) in comparison with, for example, zinc octanoate-catalyzed mixtures. The achievable skin formation times are in the range of customary joint sealants. The materials thus obtained are compatible with additives, show no inherent yellow tinge and do not become discolored under the influence of heat. In addition, the catalysts claimed are not critical during handling and in the ready-to-use end product in the sense of legislation on hazardous materials, in contrast to organotin compounds or even heavy main group element compounds, such as barium or lead.

The compositions are therefore excellently suitable, for example, as sealing compounds for joints, including vertical joints, and similar cavities having, for example, a clearance of 10 to 40 mm, for example of buildings, land vehicles, water vehicles and aircraft, or as adhesives or sealing compounds, for example in window construction or in the production of aquaria or display cases, and, for example, for the production of protective coatings, including those for surfaces exposed to the continuous action of fresh or sea water, for slip-preventing coatings, or for elastomeric moldings and for the insulation of electrical or electronic apparatuses. Likewise, such materials can be used in the industrial sector, such as the sealing of housings, control devices, plant parts and motor parts, and the potting of components, or even as a protective coating.

EXAMPLES

In the examples described below, all viscosity data are based on a temperature of 25° C. unless stated otherwise. Unless stated otherwise, the following examples are carried out at ambient pressure, i.e. at about 1000 hPa, and at room temperature, i.e. at about 23° C., or at a temperature which is established on combining the reactants at room temperature without additional heating or cooling, and at a relative humidity of about 50%. Furthermore, all data expressed in parts and percentages are based on weight, unless stated otherwise.

Alkoxy-RTV-1
1) Base Polymer Mixture:

Instead of the described functionalization of the polydimethylsiloxane with vinyltrimethoxysilane and LiOH as a catalyst, a polymer endcapped beforehand with vinyltrimethoxysilane and zinc acetylacetonate was used. For this purpose, 600 g of α,ω-OH-terminal polydimethylsiloxane having a viscosity of 80,000 mPa·s, 120 g of trimethylsilyl-terminal polydimethylsiloxane having a viscosity of 100 mPa·s and 30 g of vinyltrimethoxysilane and 0.3 g of zinc acetylacetonate were mixed. After 24 h, the endcapping is complete.

Comparative Mixture 1) According to Example F of EP 1 230 298 B1:

For this purpose, 19.5 g of Wacker HDK V15 silica were incorporated into 300 g of the base polymer mixture and stirred until smooth. 2.5 g of 3-aminopropyltrimethoxysilane were added thereto as an adhesion promoter and then catalyzed with 0.1 g of dibutyltin laurate (=DBTL).

Comparative Mixture 2) with Octa-Soligen Zinc According to EP 1 230 298 B1:

For this purpose, 19.5 g of Wacker HDK V15 were incorporated into 300 g of the base polymer mixture and stirred until smooth. 2.5 g of 3-aminopropyltrimethoxysilane were added thereto as an adhesion promoter and then catalyzed with 2.5 g of Octa-Soligen Zinc 18 ($Zn(oct)_2$) (Borchers).

Example 1

For this purpose, 19.5 g of Wacker HDK V15 were incorporated into 300 g of the base polymer mixture and stirred until smooth. 2.5 g of 3-aminopropyltrimethoxysilane were added thereto as an adhesion promoter and then catalyzed with 3 g of Octa-Soligen Lithium 2 ((Li(oct)) Borchers).

Acetoxy-RTV-1 Examples:
Preparation of a Base Mixture:

22 parts of a hydrophobized pyrogenic silica were incorporated into 45 parts of an α,ω-OH-terminal polydimethylsiloxane having a viscosity of 20 000 mPa·s and 35 parts of an α,ω-OH-terminal polydimethylsiloxane having a viscosity of 80 000 mPa·s and kneaded until homogeneous.

Example 2

38 parts of an α,ω-OH-terminal polydimethylsiloxane having a viscosity of 6000 mPa·s and 6.8 parts of methyltriacetoxysilane were added to 100 parts of the base polymer mixture. The mixture was homogenized and then 1.1 parts of Octa-Soligen Strontium 10 (Borchers) ($Sr(oct)_2$) were added as a catalyst.

Example 3

As for example 2), but 1.1 parts of Octa-Soligen Lithium 2 were used as the catalyst.

Oxime-RTV-1 Examples

Example 4

200 parts of an α,ω-OH-terminal polydimethylsiloxane having a viscosity of 80,000 mPa·s, 125 parts of an α,ω-trimethylsilyl-terminal polydimethylsiloxane and 18 parts of methyltris(methylethylketoximo)silane are homogenized with 10 parts of an amino-functional adhesion promoter (Wacker AMS70) in a planetary dissolver. Thereafter, 30 parts of finely divided silica (Wacker HDK V15) are incorporated homogeneously. The mixture is catalyzed with 4 parts of Octa-Soligen Strontium 10.

Example 5

See Example 4, but 4 parts of Octa-Soligen Lithium 2 are mixed in as a catalyst.

Table 1 shows the results of the skin formation time ("SFT") in minutes (min). It was determined as follows: after the application of the RTV-1 material from a cartridge, the formation of a skin is assessed by touching the surface with a pencil of hardness HB. The period until a string is no longer drawn between the material and the pencil tip is considered to be the skin formation time.

In addition, the vulcanization assessment was reproduced in table 1. It was determined as follows: after application of the RTV-1 material from a cartridge, the surface tack is appraised by pressing on and pulling off a PE film. The surface tack is considered positive with respect to freedom from tack after twice the skin formation time. In a further step, the course of through-curing is assessed, in a 10 mm strand in the case of stable materials and in an aluminum beaker (28 mm diameter, 20 mm height) in the case of flowable materials. In the case of tack-free through-curing, the assessment is considered positive.

The visual inspection was effected by manual appraisal of the test specimens after a vulcanization time of 14 days under standard climatic conditions.

The through-curing was determined as follows.

An aluminum capsule (28 mm diameter, 20 mm height) is filled to the rim with the crosslinkable mixture, and excess material is scraped off flush using a doctor blade. The capsules are stored under standard climatic conditions and cut open perpendicularly after 24 h. The vulcanized elastomer layer is freed from unvulcanized material using a cloth. The vulcanizate skin is measured using a commercially available thickness gage.

TABLE 1

| Mixture | Catalyst | SFT [min] | Through-curing [mm/24 h] | Visual inspection | Vulcanization assessment |
|---|---|---|---|---|---|
| Comparative mixture 1 | DBTL | 10 | 4 | Transparent Non-yellowing | Good through-curing, nontacky |
| Comparative mixture 2 | Zn(oct)$_2$ | 400 | 2 | Transparent Slightly yellowish | Poor through-curing, still strongly tacky on the surface after 48 h |
| Example 1* Alkoxy | Li(oct) | 175 | 3.0 | Transparent Non-yellowing | Good through-curing, no residual tack after 24 h |
| Example 1* Alkoxy | Sr(oct)$_2$ | 150 | 3.5 | Transparent Non-yellowing | Good through-curing, no residual tack after 24 h |
| Example 2* Acetoxy | Sr(oct)$_2$ | 30 | 4 | Transparent Non-yellowing | Good through-curing, no residual tack after 24 h |
| Example 3* Acetoxy | Li(oct) | 17 | 4 | Transparent Non-yellowing | Good through-curing, no residual tack after 24 h |
| Example 4* Oximo | Sr(oct)$_2$ | 34 | 3.5 | Transparent Non-yellowing | Good through-curing |
| Example 5* Oximo | Li(oct) | 32 | 3.5 | Transparent Non-yellowing | Good through-curing |

*According to the invention

Dibutyltin catalysts are known to be very reactive and generally to have skin formation times of 10-40 minutes, depending on the formulation. The Octa-Soligen zincs claimed in EP 1 230 298 A1 lead, in the manner described according to comparative example 2, to no satisfactory result.

As can be seen from the table, the use of Octa-Soligen lithium in the case of the sluggishly reacting alkoxy-RTV1 is substantially more suitable than Octa-Soligen zinc catalysts. In acetoxy- and oximo-RTV1, it is possible to achieve skin formation times which are entirely within the range of customary catalyst systems, i.e. catalyst systems corresponding to the prior art. In all cases, a stable and strong skin forms and the through-vulcanization is good.

The mixtures exhibit good storage stability (in the case of constant skin formation times) and, in contrast to titanium catalysts, very good compatibilities with adhesion promoters. Vulcanizates and mixtures moreover have no yellow tinge or discoloration even after storage at elevated temperature (180° C., 14 days).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A condensation-crosslinking silicone composition comprising
   (A) 100 parts of at least one organosilicon compound having at least 2 condensable groups,
   (B) 1-10 parts of at least one crosslinking agent selected from the group consisting of tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidyloxy)propyltriethoxysilane, 1,2-bis(trimethoxysilyl)ethane, 1,2-bis(triethoxysilyl)ethane, methyltris(methylethylketoximo)silane, vinyltris(methylethylketoximo)silane, tetrakis(methylethylketoximo)silane, partial mixed hydrolyzates thereof, and mixtures thereof,
   (C) at least one filler,
   (D) 0.1-50 parts of at least one adhesion promoter selected from the group consisting of a hydrolyzable alkoxysilane bearing vinyl, epoxy, amino, (meth)acryloyloxy, acid anhydride, acid, ester or ether groups and mixed hydrolyzates thereof, and
   (E) at least one catalyst in a catalytic amount, selected from the group consisting of carboxylates of the metal Sr, and
   wherein the composition is free of organotin compounds.

2. A process for the preparation of a composition of claim 1, comprising mixing all constituents with one another.

3. An adhesive, sealing compound, coating, or potting composition comprising a condensation-crosslinking silicone composition of claim 1.

4. The composition of claim 1, which is free of titanium metal catalysts.

5. The composition of claim 1, wherein at least one adhesion promoter (D) is 3-aminopropyltrimethoxysilane, 3-aminopropyltriethoxysilane, or a mixture thereof.

6. A condensation-crosslinking silicone composition comprising
   (A) at least one organosilicon compound having at least 2 condensable groups,
   (B) at least one crosslinking agent,
   (C) at least one filler,
   (E) at least one catalyst in a catalytic amount, selected from the group consisting of carboxylates of the metal Sr, and
   wherein a mixture of Li compounds and Sr carboxylates are used as catalyst (E); and
   wherein the composition is free of organotin compounds.

7. A condensation-crosslinking silicone composition comprising
   (A) at least one organosilicon compound having at least 2 condensable groups,
   (B) at least one crosslinking agent,
   (C) at least one filler,
   (E) at least one catalyst in a catalytic amount, selected from the group consisting of carboxylates of the metal Sr, and
   wherein the catalyst(s) (E) are the sole catalysts,
   and wherein the composition is free of organotin compounds.

8. The composition of claim 7, which is free of titanium metal catalysts.

* * * * *